W. I. WHEELER.
TRANSMISSION MECHANISM.
APPLICATION FILED FEB. 24, 1920.
1,377,377.
Patented May 10, 1921.
4 SHEETS—SHEET 4.
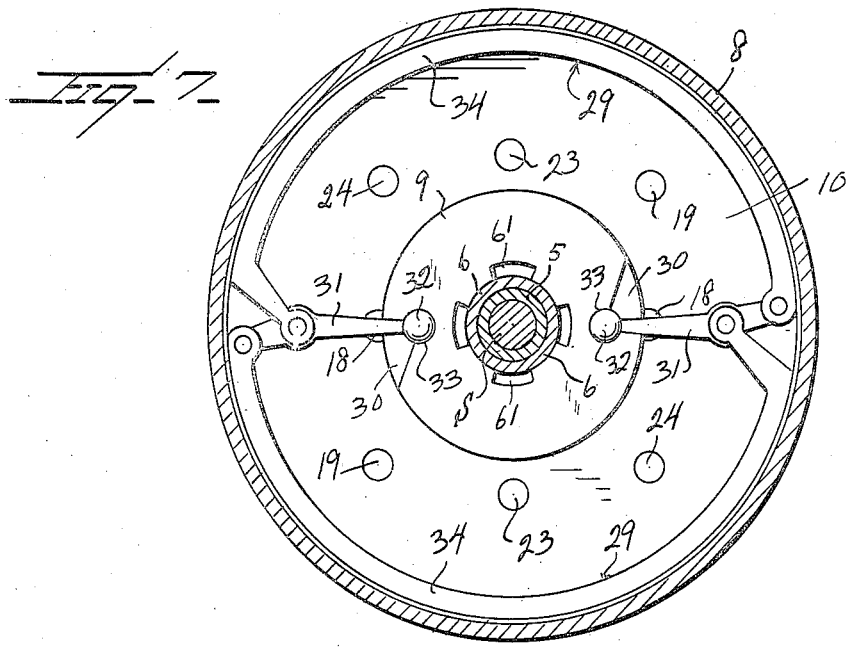
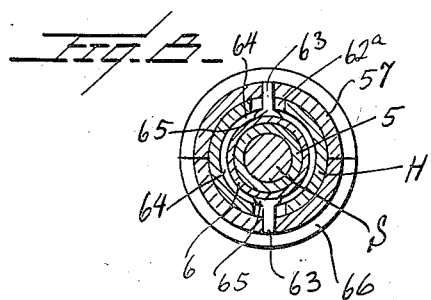
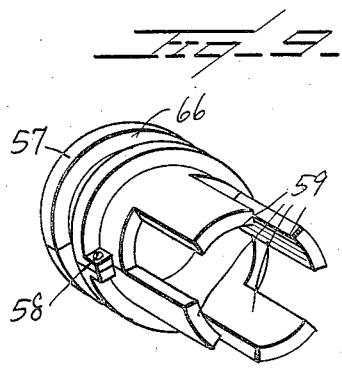
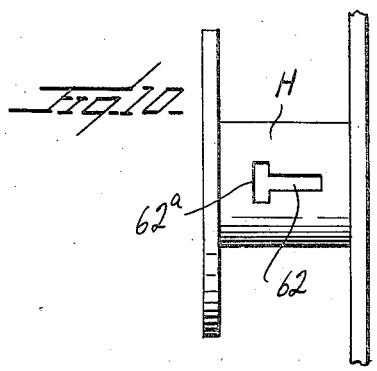
Inventor
W. I. Wheeler.
By Watson E. Coleman
Attorney

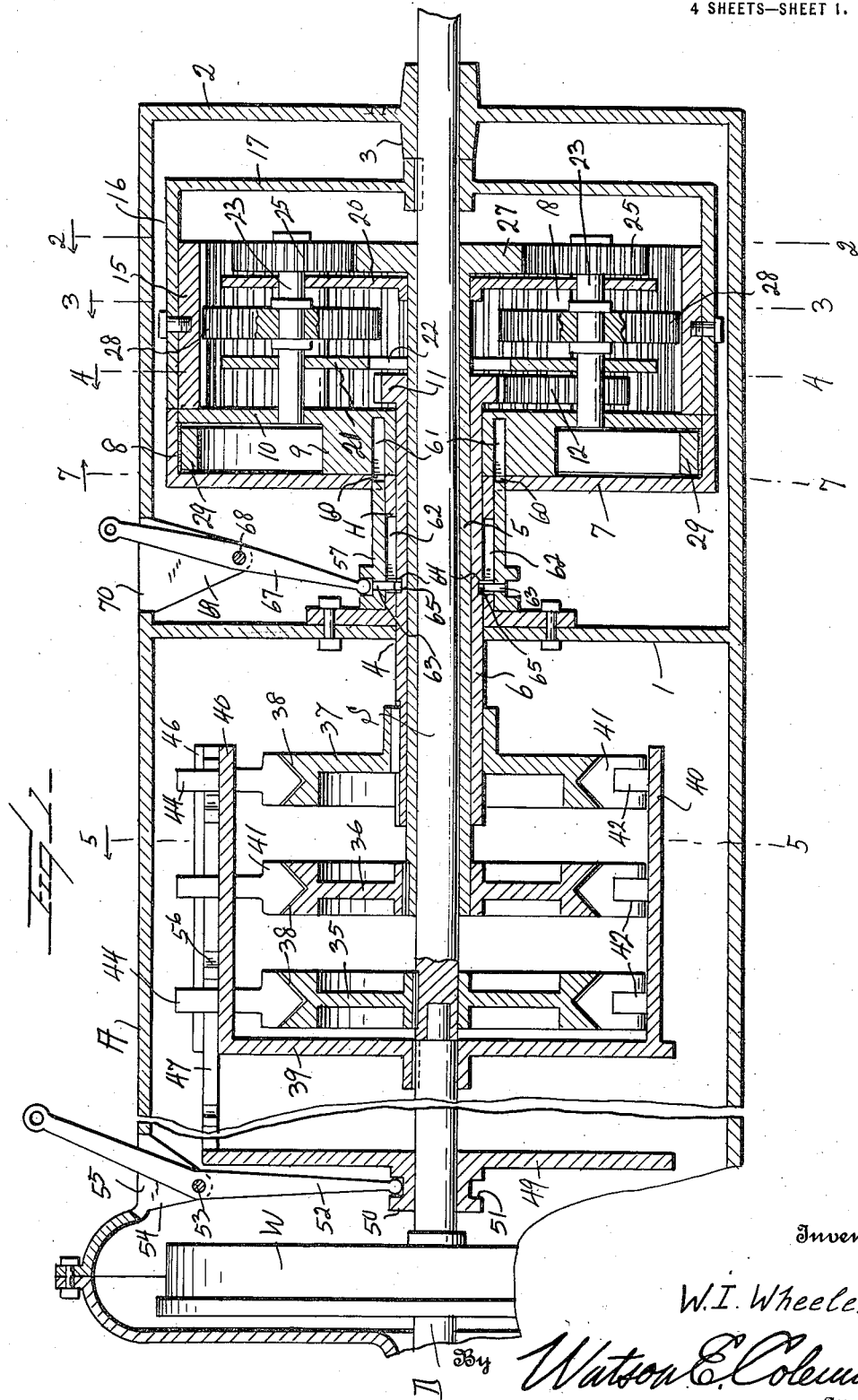

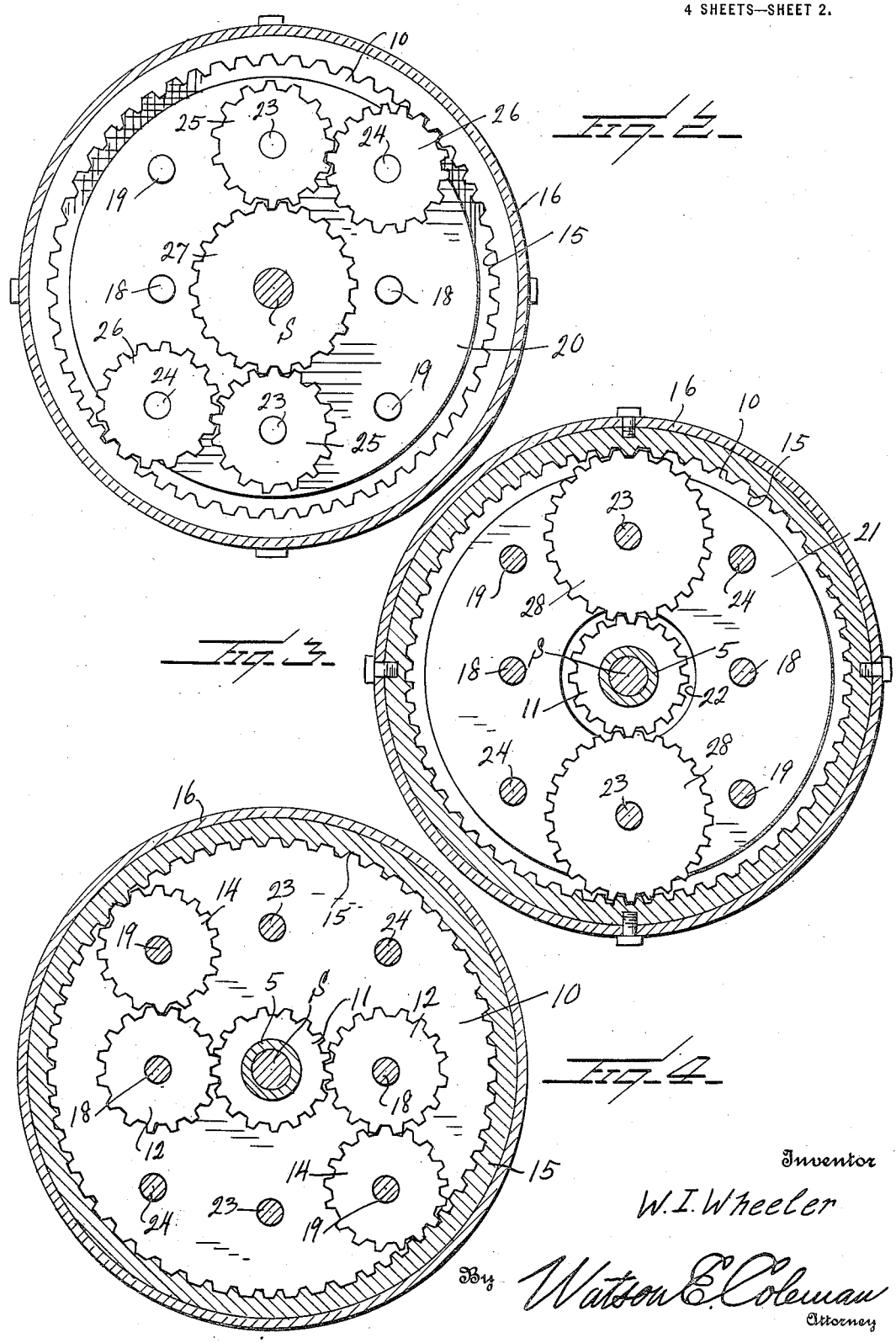

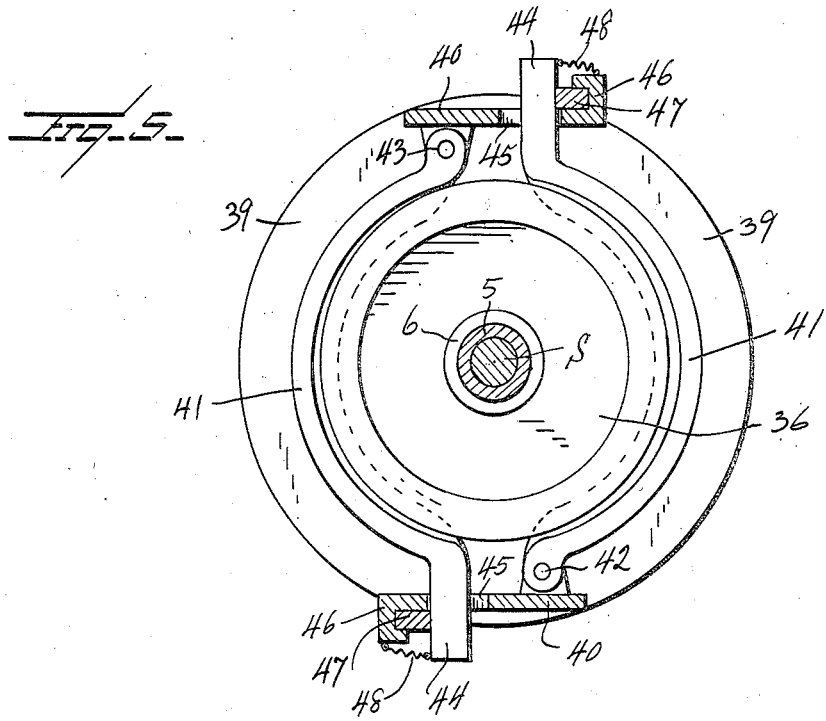
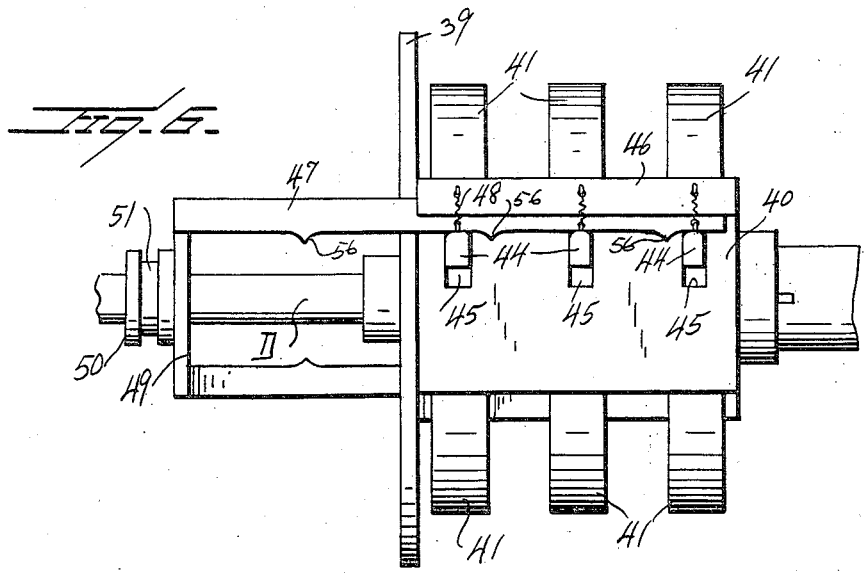

UNITED STATES PATENT OFFICE.

WILLIAM I. WHEELER, OF SCOTTVILLE, ILLINOIS.

TRANSMISSION MECHANISM.

1,377,377. Specification of Letters Patent. Patented May 10, 1921.

Application filed February 24, 1920. Serial No. 360,956.

*To all whom it may concern:*

Be it known that I, WILLIAM I. WHEELER, a citizen of the United States, residing at Scottville, in the county of Macoupin and State of Illinois, have invented certain new and useful Improvements in Transmission Mechanisms, of which the following is a specification, reference being had to the accompanying drawings.

This invention relates to certain improvements in transmission mechanism such as is used in connection with motor driven vehicles, and it is an object of the invention to provide a novel and improved device of this general character wherein the driven shaft may be caused to rotate at different speeds without the necessity of shifting of gears.

It is also an object of the invention to provide a novel and improved transmission of this general character embodying means whereby a reverse speed may be readily and conveniently obtained.

An additional object of the invention is to provide means whereby the driven shaft is effectively locked when the transmission is in neutral so that the vehicle to which my improved transmission is applied is effectually prevented from running wild down an incline when the engine is at rest.

Furthermore, it is an object of the invention to provide a novel and improved transmission wherein the driven shaft may be caused to rotate at different speeds and wherein said driven shaft may be placed in neutral at a point intermediate the speeds and which is of particular advantage when the driven shaft is adapted to be rotated at three speeds.

The invention consists in the details of construction and in the combination and arrangement of the several parts of my improved transmission mechanism whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a longitudinal sectional view with the portions in elevation of a transmission constructed in accordance with an embodiment of my invention;

Fig. 2 is a sectional view taken substantially on the line 2—2 of Fig. 1;

Fig. 3 is a sectional view taken substantially on the line 3—3 of Fig. 1;

Fig. 4 is a sectional view taken substantially on the line 4—4 of Fig. 1;

Fig. 5 is a sectional view taken substantially on the line 5—5 of Fig. 1;

Fig. 6 is a fragmentary view in top plan illustrating the means for operating the clutch mechanism;

Fig. 7 is a sectional view taken substantially on the line 7—7 of Fig. 1;

Fig. 8 is a fragmentary sectional view illustrating in detail the means for imparting endwise movement to one of the sleeves comprised in my improved transmission;

Fig. 9 is a view in perspective of the slidable sleeve herein embodied for imparting movement to the sliding sleeve and for holding the locking member of the gear assemblage against rotation; and Fig. 10 is a view in top plan of the fixed hub upon which the sleeve illustrated in Fig. 9 is slidably mounted.

As disclosed in the accompanying drawings, D denotes a driving shaft of a motor vehicle supported in a conventional manner and which has mounted thereon a fly wheel W, said wheel W being arranged within an enlarged end portion of an elongated and substantially cylindrical housing A.

The housing A is provided with an intermediate web or partition 1 and the end of the housing A remote from the wheel W is permanently closed by the head or wall 2.

The driving shaft D has its end portion within the housing A operatively engaged with an end portion of a driven shaft S, said shaft S being in longitudinal alinement with the shaft D. The head 2 of the housing A is provided with the bearing 3 through which the shaft S extends and is supported thereby. The shaft S also extends through a suitable opening 4 provided in the web or partition 1.

Loosely mounted upon and surrounding the shaft S is an elongated sleeve 5 extending through the opening 4 of the web or partition 1 and terminating at a predetermined point at opposite sides thereof. Surrounding the sleeve 5 and loosely mounted thereon is a second sleeve 6, also extending through the opening 4 in the web or partition 1 and of a length whereby the opposite ends of said sleeve 6 terminate a desired distance inwardly of the ends of the sleeve 5. The combined diameter of the assembled shaft S and sleeves 5 and 6 is substantially the same as the diameter of the opening 4 whereby said assembly snugly fits therein.

Secured to the face of the web or partition 1 opposed to the end wall or web 2 is a hub H, the bore of which being in continuation of the opening 4. The hub H is of desired length and its outer end portion is engaged with the axial center of a disk 7 provided at its periphery with forwardly directed annular flange 8.

9 denotes a hub loosely mounted upon the sleeve 6 and concentric to the flange 8. The outer end portion of the hub 9 is provided with a plate 10, the periphery of which closely approaching the inner face of the flange 8 at the outer or free marginal portion thereof, said hub 9 and plate 10 being capable of rotary movement independently of the disk 7 and the flange 8 thereof.

The sleeve 6 in advance of the hub 9 is provided with a gear wheel 11. The gear wheel 11 drives the pinions 12 which correspond in arrangement and function with the pinions 14, said pinions 14 being arranged outermost and engaging the internal gear wheel 15. The internal gear wheel 15 is relatively broad and is secured to the inwardly disposed annular flange 16 defining the peripheral portion of a disk or plate 17 keyed to the shaft S at a point in close proximity to the bearing 3. The free marginal portion of the flange 16 closely approaches the free edge of the flange 8 whereby the assembly coacting with said flanges 8 and 16 may be arranged within a minimum of space.

The gears 12 and 14 are mounted respectively upon the shafts 18 and 19. Each of the shafts 18 and 19 has one end portion engaged with the disk 10 and the opposite end portion is disposed through a disk 20, loosely mounted on the adjacent end portion of the sleeve 6 but in spaced relation with respect to the gear 11. The shafts 18 and 19 are also disposed through an intermediate plate 21, the central portion of said plate 21 being provided with an opening 22 of a diameter to readily permit the gear 11 to pass therethrough for a purpose which will hereinafter be more fully explained. Also connecting the disks 10 and the plates 20 and 21 are the shafts 23 and 24 upon which are mounted respectively the intermeshing gears 25 and 26. Each of the inner gears 25 meshes with the internal gear 15 while each of the outer gears 26 meshes with a gear 27 fixed to the forward end portion of the sleeve 5. The gear 27 constitutes the second speed gear while the gear 11 constitutes the first speed gear.

Idly mounted upon the shafts 23 between the plates 20 and 21 are the gears 28, there being one gear at opposite sides of said shaft S. Each of the gears 28 is constantly in mesh with the internal gear 15 and is of such radius that when the sleeve 5 is moved forwardly, the gear 11 carried thereby will mesh with the gears 28 whereby a reverse movement is imparted to the driven shaft S.

The disk 7 and the flange 8 constitute a brake drum and with which coacts the expansible brake elements 29. The construction and mounting of these brake elements is particularly disclosed in Fig. 7. At diametrically opposed points, the periphery of the hub 9 is provided with the sockets 30. From the sockets 30 extend the links 31. The inner ends of the links 31 are provided with the balls 32 seating in supplemental sockets 33 so that the links 31 will be carried in a substantially radial position when the hub 9 rotates in one direction but will be automatically shifted to a position inclined to the radial when this member 9 is shifted in the opposite direction.

Each of the links 31 is pivotally connected to the adjacent end portions of the friction band or brake sections 34. It is to be noted in Fig. 7 that one end of each band or brake section is pivoted inwardly of the adjacent end of the second band or brake section and that there is sufficient space between the band or brake sections to permit the same to rock. The links 31 operate as toggle links so that when the hub 9 is rotated in one direction, the band or brake sections 34 will be expanded and when rotated in the opposite direction, said band or brake sections will be contracted. When the sections 34 are expanded, they frictionally engage the flange 8 and thereby hold the disk 10 and the hub 9 against rotation.

The shaft S has keyed to its end portion adjacent the drive shaft D a wheel 35 and the adjacent end of the sleeve 5 has keyed thereto a wheel 36. The adjacent end portion of the sleeve 6 has keyed thereto a wheel 37 but as is particularly illustrated in Fig. 1, it is to be noted that the connection between the wheel 37 and the sleeve 6 is such as to permit the sleeve 6 to have longitudinal movement independently of the wheel 37 during the rotation of said wheel. Each of the wheels 35, 36 and 37 are substantially the same diameter and the periphery of each is provided with a circumferentially disposed and continuous groove or channel 38, V-shape in cross section.

Keyed to the drive shaft D at a point in close proximity to the adjacent end of the driven shaft S is a disk or plate 39. The plate 39, at diametrically opposed points, is provided with the inwardly directed arms 40 of a length to extend across the peripheries of the wheels 35, 36 and 37 but spaced therefrom. The arms 40, as illustrated in Figs. 5 and 6, are relatively broad. Coacting with each of the wheels 35, 36 and 37 are the band or brake sections 41, having their working faces V-shape in cross section to snugly engage within the groove 38 of the coacting wheel whereby an increased frictional area is provided to assure the requisite coaction between said brake band or brake sections 41 and said wheel. One of the brake or band sections 41 is pivotally engaged, as at 42, with an arm 40 to one side of its longitudinal center while an end portion of the second band or brake section 41 is pivotally connected, as at 43, with the second arm 40 at one side of its transverse center. The opposite or free end portions of each of the brake or band sections 41 is provided with an extension or ear 44, extending through a transversely disposed slot 45 formed in the adjacent arm 40.

Each of the arms 40 outwardly of the extensions or ears 44 is provided with a longitudinally disposed angular flange 46 extending longitudinally thereof and which provides a guideway for an actuator arm 47. Connecting each of the extensions or ears 44 and the flange 46 is a retractile member 48 which operates to normally maintain the coacting band or brake section out of engagement with its wheel. The actuator arms 47 have their outer end portions secured to a disk 49 slidably mounted upon the drive shaft D. The disk 49 is provided with a hub 50 provided in its periphery with an annular groove or channel 51 in which extends an end portion of an arm 52. The arm 52 is pivoted, as at 53, at a predetermined point midway its ends to an inwardly directed lug 54 carried by a wall of the housing H and positioned adjacent a slot 55 in said wall and through which an end portion of said arm 52 extends. The exterior end portion of the arm 52 is adapted to be connected to any suitable operating medium such as a rod or the like, whereby the actuator arms 47 are provided with a plurality of properly spaced and inwardly disposed cams 56, each of which being adapted for coaction with an extension or lug 44.

When certain of the cams 56 of the actuating arms 47 engage the ears or extensions 44 of the strap or band sections 41 coacting with the wheel 35, said band sections operate to hold the wheel 35 against rotation whereupon the shafts D and S are caused to rotate at the same speed or what may be termed third speed or high. When the band or brake sections 41 are caused to lock the wheel 36, the shaft S is driven at second speed and when the actuator arms 47 are adjusted to cause a locking of the wheel 37, the shaft S rotates at first speed or low.

Surrounding the hub H and having sliding movement longitudinally thereof is a sleeve 57. The sleeve 57 is preferably divided longitudinally into two sections, as illustrated in Fig. 9, said sections being detachably connected, as indicated at 58. This particular construction of the sleeve 57 is provided in order to facilitate its proper assembly. The end portion of the sleeve 57 adjacent the disk 7 is provided with the outstanding and longitudinally disposed arms 59 in predetermined spaced relation in a direction circumferentially of the sleeve. Said arms 59 normally extend within the suitably formed openings 60 produced in the disk 7 and when the sleeve 50 is moved in a direction toward the disk 7, said arms 59 extend within the recesses or pockets 61 formed in the adjacent side face of the hub 9, whereby said hub 9 and the disk 10 are held against rotation. The hub H is provided at diametrically opposed points with the longitudinally disposed slot 62 through which extend the inwardly directed pins or shanks 63 carried by the sleeve 57. Each of the shanks has its inner end portion extending in a circumferentially disposed and continuous groove or channel 64 produced in the periphery of the sleeve 5 and the portion of the pin or shank 63 within said groove 64 is provided with a shoe 65 whereby increased contacting surfaces are provided. One end portion of the slot 62 is intersected by a circumferentially disposed slot 62ª of a length in excess of the length of a shoe 65 in order to permit the shoe 65 to be properly engaged within the groove or channel 64.

The sleeve 57 is provided in its periphery with a circumferentially disposed annular groove or channel 66 in which extends an end portion of a lever 67. Said lever 67, at a predetermined point between its ends, is pivotally supported, as at 68, with an inwardly disposed lug or bracket 69 carried by a wall of the housing A. The lug or bracket 69 is positioned adjacent an opening 70 formed in said wall of the housing A and through which an end portion of the lever 67 extends. The extended end portion of the lever 67 is adapted to have engaged therewith an operating medium of any desired character, such as a rod.

Upon swinging or rocking the lever 67 in one direction, the sleeve 57, through the instrumentality of the arms 59 carried thereby, engages the hub 9 and thereby locks said hub and the parts carried thereby against rotation. At the same time, the shanks or pins 63 move the sleeve 5 in a direction toward the end wall or head 2 of the housing A whereby the gear 11 is caused to pass through the opening 22 and mesh with the gears 28 whereby the mechanism is placed in reverse.

It is to be particularly noted that the coaction of the actuator arms 47 with the ears or extensions 44 of the various band or brake sections 41 is such that the mechanism may be placed in neutral between the various speeds. It will also be readily understood from the foregoing description that when my improved mechanism is in neutral, the brake or band sections 34 engage the flange 8 with the resultant clutch action which prevents movement of the machine in a backward direction and which is of particular advantage should the engine be stopped when the vehicle is on an incline.

From the foregoing description, it is thought to be obvious that a transmission mechanism constructed in accordance with my invention is particularly well adapted for use by reason of the convenience and facility with which it may be assembled and operated, and it will also be obvious that my invention is susceptible of some change and modification without departing from the principles and spirit thereof, and for this reason, I do not wish to be understood as limiting myself to the precise arrangement and formation of the several parts herein shown in carrying out my invention in practice except as hereinafter claimed.

I claim:

1. A transmission device including a driving shaft, a driven shaft, a plurality of sets of transmission mechanism adapted to operatively connect the driving and the driven shafts, a portion of one set of transmission mechanism being capable of sliding movement, means for imparting sliding movement thereto, a reversing gear carried by the driven shaft and with which said movable portion of the transmission set engages when said portion is moved in one direction, and means for connecting the driving shaft to any one of the several sets of transmission mechanism.

2. A transmission mechanism including a drive shaft, a driven shaft, an internal gear surrounding the driven shaft and concentric thereto, said internal gear being fixed to the driven shaft for rotation therewith, a sleeve surrounding the driven shaft and provided with a gear, said sleeve being capable of rotation independently of the driven shaft, a second sleeve surrounding the first sleeve and capable of rotation independently thereof, said second sleeve being provided with a gear, a gear assembly including a plate mounted upon the second sleeve, said second sleeve and plate being capable of independent rotation, gears carried by said plate, one of said gears being operatively connected to the gear of the first named sleeve, a second gear of the gear assembly being operatively connected with the gear of the second sleeve, means for locking the gear assembly against rotation, and coacting clutch mechanism carried by the drive shaft and the driven shaft and each of the sleeves.

3. A transmission mechanism including a drive shaft, a driven shaft an internal gear surrounding the driven shaft and concentric thereto, said internal gear being fixed to the driven shaft for rotation therewith, a sleeve surrounding the driven shaft and provided with a gear, said sleeve being capable of rotation independently of the driven shaft, a second sleeve surrounding the first sleeve and capable of rotation independently thereof, said second sleeve being provided with a gear, a gear assembly including a plate mounted upon the second sleeve, said second sleeve and plate being capable of independent rotation, gears carried by said plate, one of said gears being operatively connected to the gear of the first named sleeve, a second gear of the gear assembly being operatively connected with the gear of the second sleeve, means for locking the gear assembly against rotation, and coacting clutch mechanism carried by the drive shaft and the driven shaft and each of the sleeves, said gear assembly including a further gear constantly in mesh with the internal gear, one of the sleeves being endwise shiftable to operatively engage the gear carried thereby with the last named gear to reverse the direction of rotation of the driven shaft.

4. A transmission mechanism including a drive shaft, a driven shaft, an internal gear surrounding the driven shaft and concentric thereto, said internal gear being fixed to the driven shaft for rotation therewith, a sleeve surrounding the driven shaft and provided with a gear, said sleeve being capable of rotation independently of the driven shaft, a second sleeve surrounding the first sleeve and capable of rotation independently thereof, said second sleeve being provided with a gear, a gear assembly including a plate mounted upon the second sleeve, said second sleeve and plate being capable of independent rotation, gears carried by said plate, one of said gears being operatively connected to the gear of the first named sleeve, a second gear of the gear assembly being operatively connected with the gear of the second sleeve, means for locking the gear assembly against rotation, coacting clutch mechanism carried by the drive shaft and the driven shaft and each of the sleeves, said gear assembly including a further gear constantly in mesh with the internal gear, one of the sleeves being endwise shiftable to operatively engage the gear carried thereby with the last named gear to reverse the direction of rotation of the driven shaft, and means for shifting said sleeve.

5. A transmission mechanism including a drive shaft, a driven shaft, an internal gear surrounding the driven shaft and concentric thereto, said internal gear being fixed to the driven shaft for rotation therewith, a sleeve surrounding the driven shaft and provided with a gear, said sleeve being capable of rotation independently of the driven shaft, a second sleeve surrounding the first sleeve and capable of rotation independently thereof, said second sleeve being provided with a gear, a gear assembly including a plate mounted upon the second sleeve, said second sleeve and plate being capable of independent rotation, gears carried by said plate, one of said gears being operatively connected to the gear of the first named sleeve, a second gear of the gear assembly being operatively connected with the gear of the second sleeve, means for locking the gear assembly against rotation, coacting clutch mechanism carried by the drive shaft and the driven shaft and each of the sleeves, said gear assembly including a further gear constantly in mesh with the internal gear, one of the sleeves being endwise shiftable to operatively engage the gear carried thereby with the last named gear to reverse the direction of rotation of the driven shaft, means for shifting said sleeve and operable independently of the means for locking the gear assembly against rotation.

6. A transmission mechanism including a driving shaft and a driven shaft, a plurality of sleeves disposed concentric to each other and the driven shaft, each of said sleeves carrying a gear at one end, said gears being of different diameters, a plurality of clutch members mounted upon the driving shaft, a plurality of clutch members mounted upon the sleeves and coacting with the first named clutch members whereby the driven shaft may be connected to any one of said sleeves, an internal gear operatively connected to the driven shaft, a plurality of sets of gears disposed between and transmitting power from the gear wheels on the sleeves to the internal gear wheel, means for automatically preventing the movement of the sets of gears around the sleeves as a center in one direction but permitting the free movement of said gears around the sleeves in the opposite direction, one of said sleeves being longitudinally shiftable, an idle gear supported for constant mesh with the internal gear, the gear carried by the shiftable sleeve operatively connecting with said idle gear upon shifting movement of said sleeve in one direction whereby the direction of rotation of the driven shaft is reverse, and means for positively holding the sets of gears against movement around the tubular sleeves in either direction when the gear of the shiftable sleeve is operatively connected to the idle gear.

7. A transmission mechanism including a drive shaft, a driven shaft operatively connected therewith, said connection including a clutch wheel coacting with the driven shaft, a pair of arms extending across the periphery of the clutch wheel at substantially diametrically opposed points and operatively connected with the drive shaft, a brake section pivotally engaged at one end with each of said arms, the opposite end portion of the brake section being provided with an ear, the adjacent arm being provided with a slot through which said ear extends, and an actuating member slidably engaged with each of the arms and coacting with an ear of a brake section to force said brake section into engagement with the brake wheel.

8. A transmission mechanism including a drive shaft, a driven shaft operatively connected therewith, said connection including a clutch wheel coacting with the driven shaft, a pair of arms extending across the periphery of the clutch wheel at substantially diametrically opposed points and operatively connected with the drive shaft, a brake section pivotally engaged at one end with each of said arms, the opposite end portion of the brake section being provided with an ear, the adjacent arm being provided with a slot through which said ear extends, an actuating member slidably engaged with each of the arms and coacting with an ear of a brake section to force said brake section into engagement with the brake wheel, and means for constantly urging the brake section away from the brake wheel.

9. A transmission mechanism including a drive shaft, a driven shaft operatively connected therewith, said connection including a clutch wheel coacting with the driven shaft, a pair of arms extending across the periphery of the clutch wheel at substantially diametrically opposed points and operatively connected with the drive shaft, a brake section pivotally engaged at one end with each of said arms, the opposite end portion of the brake section being provided with an ear, the adjacent arm being provided with a slot through which said ear extends, an actuating member slidably engaged with each of the arms and coacting with an ear of a brake section to force said brake section into engagement with the brake wheel, each of said actuating arms being supported by the drive shaft for movement longitudinally thereof, and means for imparting such movement thereto.

In testimony whereof I hereunto affix my signature.

WILLIAM I. WHEELER.